(12) United States Patent
Aare

(10) Patent No.: US 8,840,347 B2
(45) Date of Patent: Sep. 23, 2014

(54) DRILLING TOOL FOR CHIP REMOVING MACHINING AS WELL AS A LOOSE TOP THEREFOR

(75) Inventor: Magnus Aare, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 939 days.

(21) Appl. No.: 12/815,689

(22) Filed: Jun. 15, 2010

(65) Prior Publication Data

US 2010/0322728 A1  Dec. 23, 2010

(30) Foreign Application Priority Data

Jun. 23, 2009  (SE) ........................ 0900846

(51) Int. Cl.
 *B23B 51/02* (2006.01)
(52) U.S. Cl.
 CPC ............ *B23B 51/02* (2013.01); *B23B 2251/50* (2013.01); *B23B 2205/02* (2013.01); *B23B 2251/02* (2013.01); *Y10S 408/713* (2013.01)
 USPC ............................ 408/230; 408/713; 408/232
(58) Field of Classification Search
 USPC ........... 408/56, 230, 231, 232, 233, 226, 713, 408/227, 199, 200, 57, 59
 See application file for complete search history.

(56) References Cited

U.S. PATENT DOCUMENTS

| 4,950,108 | A | * | 8/1990 | Roos ................................. 408/59 |
| 5,904,455 | A | | 5/1999 | Krenzer et al. |
| 5,971,673 | A | * | 10/1999 | Berglund et al. ............. 408/1 R |
| 6,059,492 | A | * | 5/2000 | Hecht ............................ 408/144 |
| 6,506,003 | B1 | * | 1/2003 | Erickson ........................ 408/226 |
| 6,695,551 | B2 | | 2/2004 | Silver |
| 6,783,308 | B2 | | 8/2004 | Lindblom |
| 6,840,717 | B2 | * | 1/2005 | Eriksson ........................ 408/1 R |
| 6,899,495 | B2 | | 5/2005 | Hansson et al. |

(Continued)

FOREIGN PATENT DOCUMENTS

| DE | 44 35 857 | 4/1996 |
| DE | 10 2007 044 095 | 9/2007 |

(Continued)

OTHER PUBLICATIONS

European Search Report dated Oct. 6, 2011.

(Continued)

*Primary Examiner* — Eric A Gates
*Assistant Examiner* — Paul M Janeski
(74) *Attorney, Agent, or Firm* — Morgan, Lewis & Bockius LLP

(57) ABSTRACT

A drill of the loose top type, which is composed of a basic body and a replaceable loose top. In the front end of the basic body, a jaw is formed, which is delimited by two elastically bendable branches and an intermediate axial support surface, and in which the loose top can be securely pinched by inner support surfaces of the branches being resiliently pressed against side contact surfaces of the loose top. The two side contact surfaces of the loose top extend rearward from clearance surfaces that are included in the front end of the loose top. By forming the diametrical dimension between opposite side contact surfaces greater nearer the front end of the loose top, the branches of the jaw securely pinch the loose top in the area of the front ends thereof, where the branches have their maximal bending capacity.

37 Claims, 11 Drawing Sheets

(56) References Cited

U.S. PATENT DOCUMENTS

| | | | |
|---|---|---|---|
| 7,008,150 B2* | 3/2006 | Krenzer | 408/144 |
| 7,101,125 B2* | 9/2006 | Borschert et al. | 408/230 |
| 7,114,892 B2 | 10/2006 | Hansson | |
| 7,134,186 B2 | 11/2006 | Horng et al. | |
| 7,360,974 B2 | 4/2008 | Borschert et al. | |
| 7,407,350 B2* | 8/2008 | Hecht et al. | 408/231 |
| 7,625,161 B1 | 12/2009 | Ruy Frota de Souza | |
| 7,832,967 B2* | 11/2010 | Borschert et al. | 408/231 |
| 8,142,116 B2* | 3/2012 | Frejd | 408/231 |
| 8,556,552 B2 | 10/2013 | Hecht | |
| 2008/0193237 A1 | 8/2008 | Men et al. | |
| 2008/0193238 A1 | 8/2008 | Hecht | |
| 2010/0021253 A1* | 1/2010 | Frejd | 408/200 |
| 2010/0092259 A1* | 4/2010 | Borschert et al. | 408/230 |
| 2010/0266357 A1 | 10/2010 | Kretzschmann et al. | |
| 2010/0322731 A1 | 12/2010 | Aare | |
| 2011/0110739 A1 | 5/2011 | Frisendahl | |
| 2011/0236145 A1 | 9/2011 | Päbel et al. | |

FOREIGN PATENT DOCUMENTS

| | | |
|---|---|---|
| EP | 1 013 367 | 6/2000 |
| EP | 1 273 373 | 1/2003 |
| EP | 1 306 152 | 5/2003 |
| EP | 1 555 075 | 7/2005 |
| EP | 2 266 735 | 12/2010 |
| EP | 2 266 737 | 12/2010 |
| JP | 2004-527391 | 9/2004 |
| JP | 2005-169542 | 6/2005 |
| JP | 2005169542 A * | 6/2005 |
| JP | 2006-167871 | 6/2006 |
| JP | 2010-517800 | 5/2010 |
| WO | 02/34441 | 5/2002 |
| WO | 03/031104 | 4/2003 |
| WO | 2005/115667 | 12/2005 |
| WO | WO 2008014367 A1 * | 1/2008 |
| WO | 2008/072840 | 6/2008 |
| WO | WO 2008/099378 | 8/2008 |
| WO | 2009/128775 | 10/2009 |

OTHER PUBLICATIONS

Notice of Reason for Rejections (with English translation) for Japanese Patent Application No. 2010-142903, dated Mar. 4, 2014.

* cited by examiner

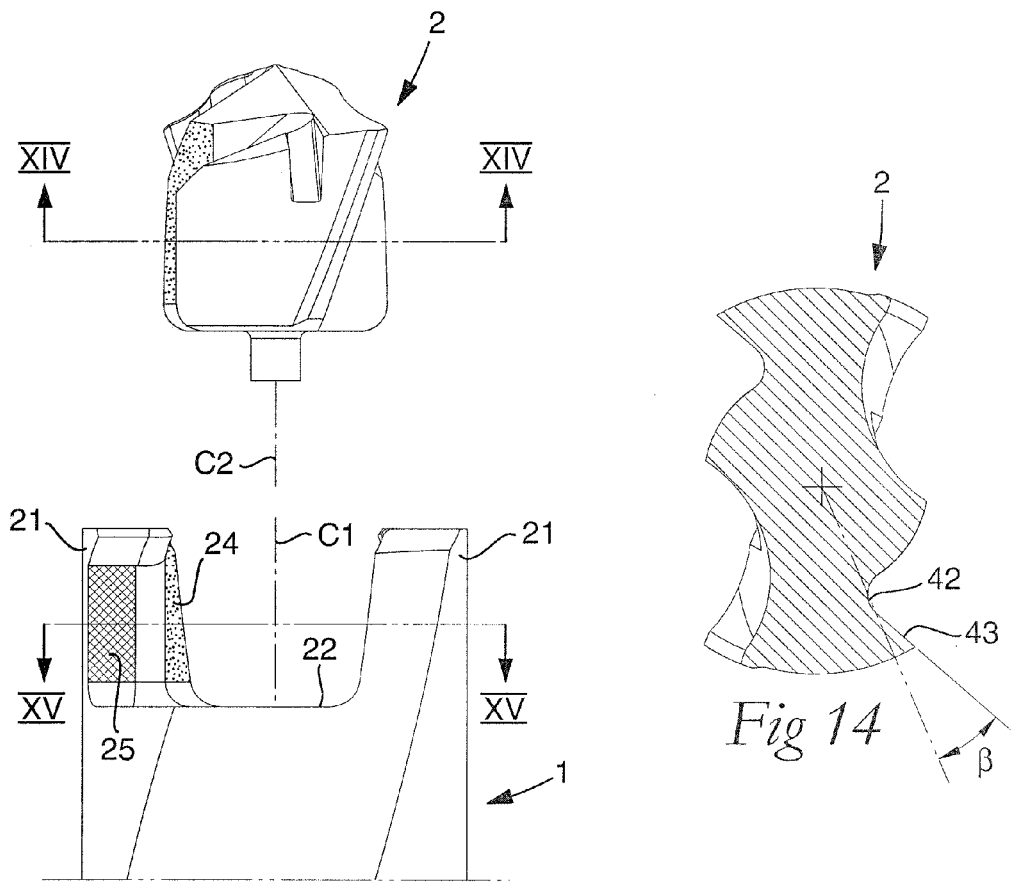
Fig 13
Fig 14
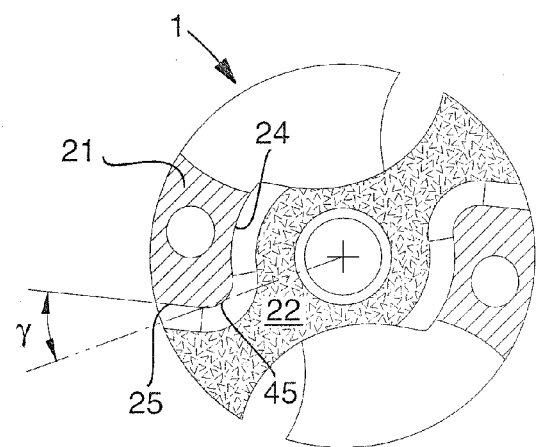
Fig 15

DRILLING TOOL FOR CHIP REMOVING MACHINING AS WELL AS A LOOSE TOP THEREFOR

CROSS-REFERENCE TO PRIOR APPLICATION

This application claims priority to Swedish Application No. 0900846-7 filed Jun. 23, 2009, which is incorporated by reference herein.

TECHNICAL FIELD

In a first aspect, this disclosure relates to a drilling tool intended for chip removing machining and of the type that includes a basic body having front and rear ends and an envelope surface that includes two countersunk chip flutes. The envelope surface is concentric with a center axis around which the basic body is rotatable in a given direction of rotation. The tool further includes a loose top that includes front and rear ends, where the rear end serves as an axial contact surface. The loose top further includes an envelope surface that is concentric with a center axis and includes two countersunk chip flutes between which two bars projecting radially from a central core are delimited. The front end of the bars include a cutting edge each and a number of clearance surfaces positioned rotationally behind the same. The front end of the basic body includes a jaw that is delimited by a bottom and two peripherally situated branches that protrude axially from the same, are elastically bendable, and have the purpose of clamping the loose top in the jaw. Specifically, a pair of inner support surfaces of the branches resiliently press against a pair of external side contact surfaces of the loose top, at least because the greatest diametrical dimension between the side contact surfaces is greater than an analogous diametrical dimension between the inner support surfaces when the branches are loaded, whereby the loose top is turnable into and out of engagement with the jaw of the basic body.

In another aspect, the dislcosure also relates to a loose top as described above.

Drilling tools of the kind in question are suitable for chip removing or cutting machining, especially hole making of workpieces of metal, such as steel, cast iron, aluminium, titanium, yellow metals, etc. The tools may also be used for the machining of composite materials of different types.

BACKGROUND ART

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Drilling tools have been developed that, contrary to solid drills, are composed of two parts, including a basic body or drill body and a head detachably connected with the same and thereby being replaceable. The head includes the requisite cutting edges. In such a way, the major part of the tool can be manufactured from a comparatively inexpensive material having a moderate modulus of elasticity, such as steel, while a smaller part, the head, can be manufactured from a harder and more expensive material, such as cemented carbide, cermet, ceramics and the like, which gives the cutting edges a good chip-removing capacity, a good machining precision and a long service life. The head forms a wear part that can be discarded after wear-out, while the basic body can be re-used several times, for example, 10 to 20 replacements. A now recognized term for these cutting edge-carrying heads is "loose tops", which henceforth will be used in this document.

Loose top type drilling tools have a plurality of desired capabilities, one of which is that torque should be transferable in a reliable way from the rotatable, driven basic body to the loose top. Furthermore, the basic body should without problems be able to carry the rearwardly directed axial forces that the loose top is subjected to during drilling. Further, the loose top should be held centered in a reliable way in relation to the basic body. Also, the loose top should be fixedly held to the basic body not only during drilling of a hole, but also during retraction of the drilling tool out of the same. A user further desires that the loose top should be mountable and dismountable in a rapid and convenient way without the basic body necessarily having to be removed from the driving machine. In addition, the tool, and in particular the loose top manufactured from expensive materials, should be capable of low cost manufacture.

Drilling tools as well as milling tools, for example, shank-end mills, of the loose top type are widely described in the patent literature and may be divided into a number of different categories depending on the ideas on which the designs are based.

A first category (see, for example, EP 1306152, EP 1328366, EP 1555075, WO03/031104, U.S. Pat. Nos. 6,695,551, 6,783,308, 6,899,495, 7,114,892, 7,134,186 and US 2008/0193237) is based on the fact that the basic body of the tool, in the front end thereof, is formed with a slot that is positioned behind the axial support surface thereof and separated into two branches. The inherent elasticity of the material in the basic body, for example, steel can be bent, for example, by radial screws, eccentric keys, etc., and be utilized to clamp the loose top. However, for differing reasons, attempts to manufacture such loose-top tools on an industrial scale have not been successful, among other things, because the slot opens not only axially but also laterally and in such a way forms a trap in which the removed metal chips may entangle themselves and entail difficulties, for example, chip jamming.

The tools in a second category (see, for example, U.S. Pat. No. 7,360,974), which like the tools in the first-mentioned category make use of flexible or elastically bendable branches formed in the basic body for the clamping of the loose top, are based on the fact that the loose top is formed with a tightening pin that protrudes rearward from the axial contact surfaces thereof and is insertable into a cavity positioned between the branches and behind the requisite axial support surfaces. The tightening pin is partially thicker than the cavity so that the tightening pin, when being inserted into the cavity, applies a resilient clamping force to the branches with the purpose of securely pinching the pin, and thereby the loose top, in the desired position. However, these loose-top tools are associated with problems and disadvantages difficult to master, which makes industrial series manufacturing more difficult. One disadvantage is that the axial length of the loose top is considerable in relation to the diameter. Because of this, the total volume of the loose top becomes comparatively large and causes expensive consumption of material in the manufacture. Another disadvantage is that the pinch or grip between the loose top and the branches is located at the rear parts of the branches, which is behind the requisite axial support surfaces, where the ability of the branches to deflect is minimal. Therefore, the more the branches are separated during clamping, the greater becomes the risk that the front parts of the branches lose contact with the loose top. In the extreme case, it is even possible that gaps arise between the outside of the loose top and the inner support surfaces of the front parts of the branches. Another one of several further disadvantages, in addition to complicated manufacture, is that cooperating pairs of axial contact surfaces of the loose top and the corresponding axial support surfaces of the basic body are rather small and peripherally located. In such a way, the axial force transmission between the loose top and the basic body may become unreliable, and unbalances may arise and jeopardize the centering of the loose top.

Further, in the above-mentioned U.S. Pat. No. 7,360,974, a drilling tool is presented, the loose top of which per se includes convex outsides that border on the front end of the loose top. In this case, the clamping of the loose top is, however, provided for by means of a rear tightening pin, which is insertable into a cavity that is positioned behind the axial support surfaces of the basic body and delimited between two flexible branches. This means that the clamping of the loose top is effected in an area where the branches have a bending and gripping capacity that is essentially smaller than in the front portions thereof.

A loose-top tool that differs markedly from the above-mentioned tools is disclosed in EP 1013367. In this case, two flexible branches, which together with an intermediate axial support surface form the jaw in which the loose top is securely pinched, are formed as peripherally situated, finger-like material portions that protrude axially from a plane axial support surface. This loose top tool does not need to be intersected by any slot or cavity in which chips could get caught. By the lack of any operatively required tightening pin protruding rearward from the axial contact surface of the loose top, the loose top can be made fairly short in relation to the diameter, which is material-saving and cost-reducing. In addition, the axial contact surface of the loose top, as well as the axial support surface of the basic body, extend between ends that are peripherally situated, where, for example, the surfaces have a length or a diametrical dimension that is as great as the diameter of the drill.

A disadvantage of the drilling tool of EP 1013367 is, however, that the grip of the branches on the loose top risks becoming weak and unreliable. Accordingly, the branches are arranged to be turned in into pockets that are recessed in the rear part of the two convex envelope surfaces that form outsides of the bars in the loose top that are delimited by the chip flutes. Each pocket has a limited axial extension that in turn limits the maximally possible length of the branches. In addition, the two conical inner support surfaces of the branches that are clamped against the corresponding conical side contact surfaces of the loose top are situated approximately halfway between the support surface of the jaw and the free ends of the branches. This means that the inner support surfaces of the branches will securely pinch the loose top in a plane situated comparatively near the rear end thereof. Only the rear portion of the loose top is held clamped between the branches, while the front portion thereof—in which the cutting forces act strongest—lacks efficient clamping. Another negative consequence of the branches having a limited length is that the tangential contact surfaces, which have the purpose of transferring torque to cooperating surfaces in the pockets of the loose top, get a limited area. In such a way, the surface pressure may become high and cause deformation damage. Furthermore, there is a risk that the loose top will be difficult to manufacture with precision that allows the loosed top to be centered in an accurate way. Accordingly, in practice it is impossible to precision-grind the side contact surfaces positioned in the interior of the pockets.

SUMMARY

The present disclosure aims at obviating the above-mentioned disadvantages of the drilling tool known by EP 1013367 and at providing an improved drilling tool. Therefore, an object is to provide a drilling tool having a loose top that in its entirety is held reliably clamped between the branches of a jaw in the basic body of the tool. In doing so, the inherent elasticity of the branches is to be utilized in an expedient way for providing an optimal grip on the loose top. Another object is to provide a drilling tool, the loose top of which has a minimal length, and thereby a minimal volume, in relation to its diameter. This can reduce the consumption of expensive material to a minimum in connection with manufacture. A further object is to provide a drilling tool with a basic body that can transfer great torques to the loose top. Furthermore, the drilling tool should allow a quick, simple and convenient replacement of the loose top, without other means than a simple key and without the basic body necessarily having to be removed from the driving machine. A factor to guarantee smooth replacements is that the branches should present only a moderate resistance to the turning-in of the loose top into the jaw of the basic body, in spite of the fact that the ability of the branches to hold the loose top reliably clamped should be good. A further object is to provide a drilling tool in which the loose top is centered, and retains its centricity, in an accurate way in relation to the basic body.

A first aspect of the invention provides drilling tool including a basic body having front and rear ends and an envelope surface that includes two countersunk chip flutes and is concentric with a first center axis around which the basic body is rotatable in a given direction of rotation. Further, the drilling tool includes a loose top that includes front and rear ends, the rear end serving as an axial contact surface, and an envelope surface that is concentric with a second center axis and includes two countersunk chip flutes between which two bars projecting radially from a central core are delimited. Each bar includes a cutting edge in the front and a number of clearance surfaces positioned rotationally behind the cutting edge. A front end of the basic body comprises a jaw that is delimited by a bottom forming an axial support surface and two peripherally situated branches that protrude axially from the axial support surface, are elastically bendable, and clamp the loose top in the jaw. A pair of inner support surfaces of the branches are resiliently pressed against a pair of external side contact surfaces of the loose top during operation. A greatest diametrical dimension between the side contact surfaces are greater than an analogous diametrical dimension between the inner support surfaces when the branches are loaded such that the loose top is turnable into and out of engagement with the jaw of the basic body. The two side contact surfaces of the loose top extend rearward from at least one clearance surface included in the front end, and a greatest diametrical dimension between the side contact surfaces in a first reference plane, which is perpendicular to the second center axis and situated nearer the front end than the rear end, is greater than an analogous diametrical dimension between the inner support surfaces of the branches when the loose top is unloaded.

A further aspect of the invention provides a loose top for drilling tools including front and rear ends, and an envelope surface that is concentric with a center axis and in which at least two chip flutes are countersunk, between which two bars projecting radially from a central core are delimited. The front end of each bar includes a cutting edge and a number of clearance surfaces positioned rotationally behind the cutting edge, and two external side contact surfaces that widen a jaw that receives the loose top and is situated between two branches of a cooperating basic body. The rear end is an axial contact surface that forms a right angle with the center axis and extends between diametrically opposed borderlines adjacent to the envelope surface. The two side contact surfaces extend rearward from at least one clearance surface included in the front end.

The two branches that delimit a jaw of the basic body have their greatest bending capacity, and thereby their optimal gripping capacity, in the area of the free ends thereof rather than in the vicinity of the rear ones. By placing the side contact surfaces of the loose top in the immediate vicinity of the front end of the loose top, a powerful grip or pinch along the front portion of the loose top adjacent to the cutting edges can be obtained. For a given axial length of the loose top, the branches can furthermore be given a optimized design that, in addition to improving the proper tightening effect, also improves the ability of the branches to transfer torque, in that the tangential contact surfaces of the branches can be made as long as the loose top. In addition, the placement and design of the cooperating surfaces afford a number of further advantages that are accounted for later in this document.

It is to be understood that both the foregoing general description and the following detailed description are exemplary and explanatory and are intended to provide further explanation of the invention as claimed.

BRIEF DESCRIPTION OF THE DRAWINGS

A particular embodiment of the invention will be described in more detail below, reference being made to the appended drawings, on which:

FIG. 13 is an exploded view of an exemplary loose top and basic body in side elevation, FIG. 14 is a cross section XIV-XIV in FIG. 13, FIG. 15 is a cross section XV-XV in FIG. 13.

DETAILED DESCRIPTION OF PREFERRED EMBODIMENTS

Figure 1:
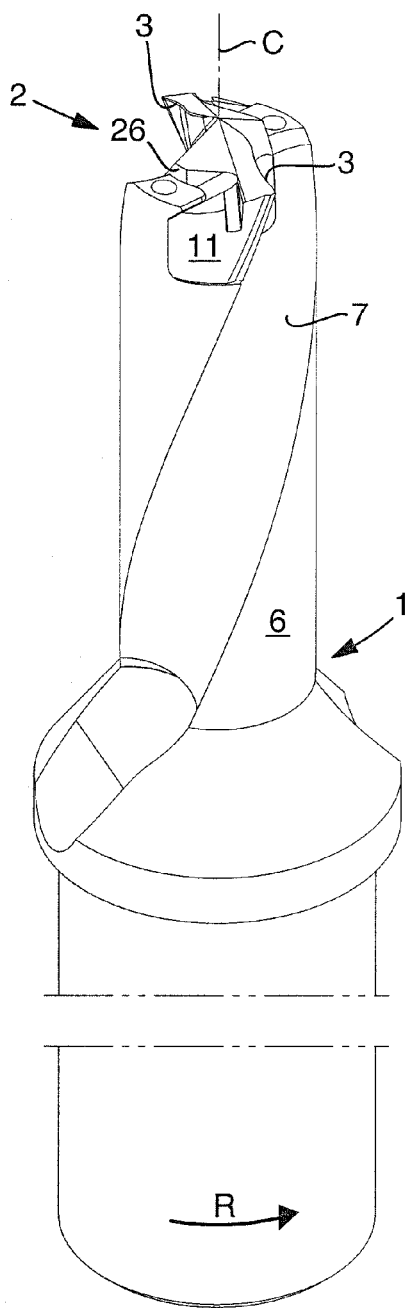
FIG. 1 is a sectioned perspective view showing an embodiment of the basic body and the loose top of the drilling tool in the composed state.

In the following description and the claims, a number of cooperating pairs of surfaces of the basic body and the loose top, respectively, will be described. When these surfaces are present on the basic body, the surfaces are denominated "support surfaces", while the corresponding surfaces of the loose top are denominated "contact surfaces" (for example, "axial support surface" and "axial contact surface", respectively). Furthermore, it should be pointed out that the loose top includes a rear end in the form of a plane surface, which serves as an axial contact surface for pressing against an axial support surface in the basic body. Depending on the context, this surface will be denominated either "rear end" or "axial contact surface". In the drawings, the cooperating surfaces contacting each other in the operative state of the drilling tool are shown by similar surface patterns.

Figure 2:
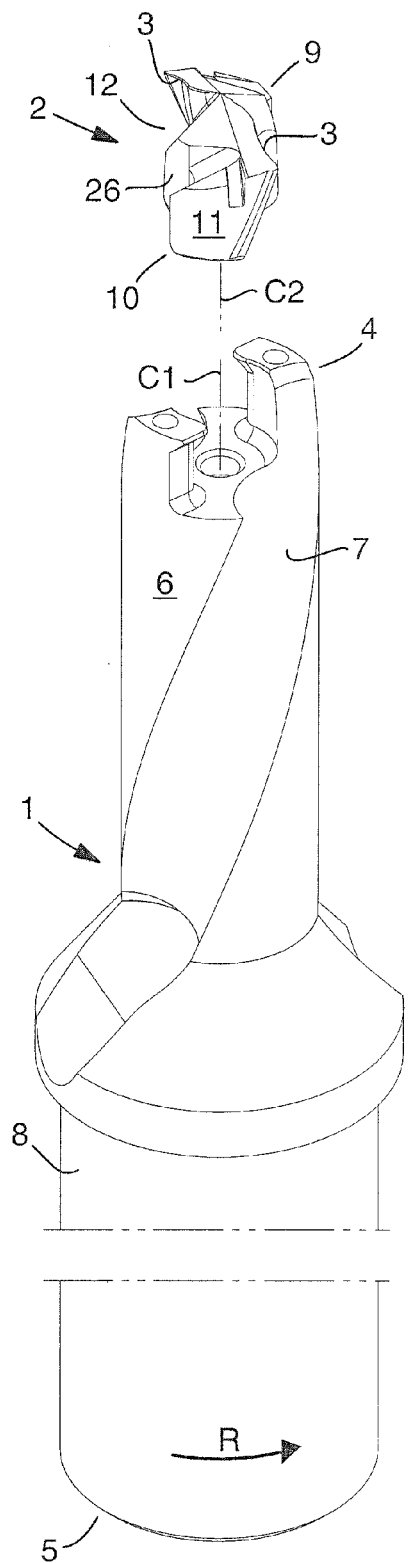
FIG. 2 is an exploded perspective view showing the loose top separated from the basic body of FIG. 1.

The drilling tool shown in FIGS. 1 and 2 is in the form of a so-called twist drill, comprises a basic body 1 as well as a loose top 2 in which the requisite cutting edges 3 are included. In its composed, operative state according to FIG. 1, the drilling tool is rotatable around a center axis indicated by C, more precisely in the direction of rotation R. In FIG. 2, it is seen that the basic body 1 includes front and rear ends 4, 5 between which a center axis C1 specific to the basic body extends. In the backward direction from the front end 4, a cylindrical envelope surface 6 extends, in which two chip flutes 7 are countersunk that in this case are helicoidal. The chip flutes could also be straight. In the example, the chip flutes 7 end in the vicinity of a collar included in a rear part 8 that is intended to be attached to a driving machine (not shown).

Also the loose top 2 includes front and rear ends 9, 10 and a center axis C2 with which an envelope surface 11 is concentric. In said envelope surface 11, two helicoidal chip flutes or chip flute sections 12 are countersunk (see also FIGS. 3-7), which form extensions of the chip flutes 7 of the basic body 1 when the loose top is mounted onto the basic body. If the loose top 2 is centered correctly in relation to the basic body 1, the individual center axes C1 and C2 coincide with the center axis C of the composed drilling tool.

Now reference is made primarily to FIGS. 3-7, which illustrate details of the loose top and the front end of the basic body, and from which it is seen that the chip flutes 7 are delimited by concave surfaces 13 that extend between helicoidal edge lines 14, 15. As is seen from the section in FIG. 6, the concave limiting surfaces 13 of the two chip flutes 7 delimit two bars 16, between which there is a central core 17a from which the bars protrude radially, more precisely in the plane P1 in which the basic body 1 has the diameter D1. Said core 17a is constituted by an inscribed circle between the portions of the concave surfaces 13 positioned nearest to each other where the basic body is thinnest. The core 17a has a diameter that is designated D2. The peripheral, convex part surface of each such bar 16 is designated 6, since the same constitutes a part of the envelope surface of the basic body. In an analogous way, concave surfaces 18 (see FIG. 7) in the chip flutes 12 of the loose top 2 delimit a pair of bars 19. The peripheral, convex surfaces of said bars are designated 11 because they constitute part surfaces of the envelope surface of the loose top.

In the front end of the basic body, a jaw 20 (see FIGS. 3 and 4) is formed that is delimited by two identical branches 21 and an intermediate bottom 22 that forms an axial support surface for the loose top. Each branch 21 includes an inner support surface 24, which in this case is concave, and a tangential support surface 25, which is facing forward in the direction of rotation R and transfers torque from the branch to the loose top. The individual branch 21 is elastically bendable to be resiliently clampable against the loose top 2. This is realized by the material in at least the front portion of the basic body 1 having a certain inherent elasticity or lower modulus of elasticity than the material in the loose top. The material in at least the front portion can include steel. The material in the loose top may in a traditional way include cemented carbide, which is hard carbide particles in a binder metal, cermet, ceramics or the like. Advantageously, the bottom or the axial support surface 22 in the jaw 20 is plane and extends perpendicularly to the center axis C1 and diametrically between the envelope surfaces 6 of the two bars. In other words, the axial support surface 22 has a diametrical length extension that is as great as the diameter D1 of the basic body.

Figure 5:
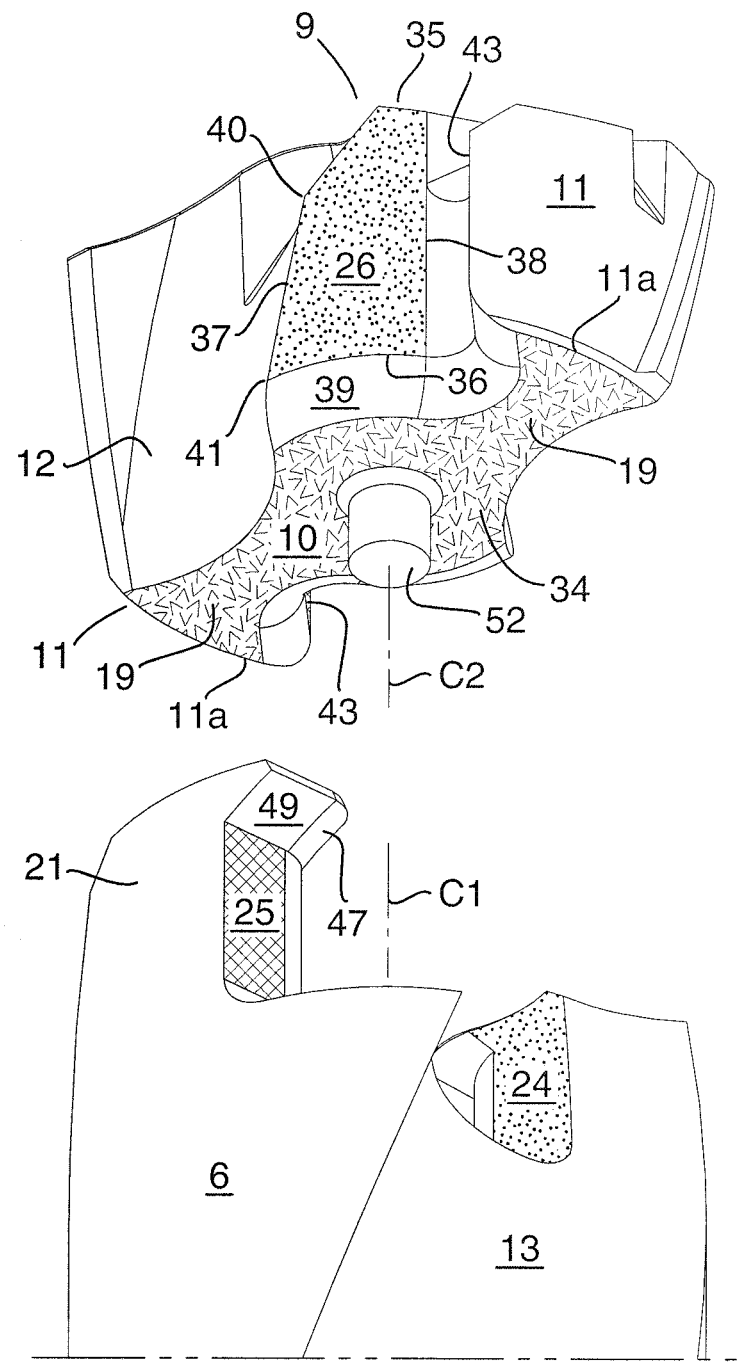
FIG. 5 is an exploded view showing the basic body and the loose top of FIG. 1 in bottom perspective view.

As is seen in FIG. 5, the rear end 10 of the loose top 2 is represented by an axial contact surface that, like the axial support surface 22, most suitably is plane and extends perpendicularly to a center axis C2. Also the axial contact surface 10 extends between diametrically opposed envelope part surfaces 11. Furthermore, the loose top 2 includes external side contact surfaces 26, which in the example are convex, and against which the inner support surfaces 24 of the branches can be clamped.

The front end 9 of the loose top (see FIG. 3), in which the cutting edges 3 are included, is represented by an end surface that is composed of a plurality of part surfaces, which in this case are pair-wise identical and which therefore are not described individually. Behind the individual cutting edge 3, as viewed in the direction of rotation, a primary clearance surface 27 is formed, which has a moderate clearance angle and transforms into a secondary clearance surface 28 having a greater clearance angle via a borderline 29. Via an additional borderline 30, the secondary clearance surface 28 transforms into a third clearance surface 31, which in turn transforms into a chip flute 12 being behind via an arched borderline 32. The concave surface 18 of the chip flute 12 extends at least partly up to a cutting edge 3 and forms there a chip surface for the same. Of course, in the composed end surface 9, other part surfaces than exactly those ones exemplified in the drawings may also be included. Adjacent to the envelope surface 11, a guide pad 33 is formed that includes a clearance surface and has the purpose of guiding the drilling tool, but also of surface-finishing or wiping the hole wall generated axially behind the cutting edges. The diameter of the drilled hole is determined by the diametrical distance between the peripheral points 3a, 3b where the cutting edges 3 meet the guide pads 33. Further, the two cutting edges converge into a tip T, which forms the very foremost part of the loose top, and in which there may be included a so-called chisel edge and a minimal centering punch.

The two convex side contact surfaces 26 of the loose top (see FIGS. 3 and 5) extend axially rearward from the front end 9 of the loose top, making it possible to establish the pinch or grip of the branches as frontal as possible along the loose top. The side contact surfaces 26 are formed on two diametrically opposed, slightly C-shaped web portions 26a (see FIG. 7), which include material portions that are thickened in relation to a core 17b that is included in the loose top and in this case has essentially the same diameter D2 as the core 17a of the basic body 1. A diametrical dimension, generally designated DM, between the side contact surfaces 26 is therefore considerably greater than the diameter D2 of the core 17b, which is determined by the smallest distance between the concave limiting surfaces 18 of the two chip flutes.

Figure 3:
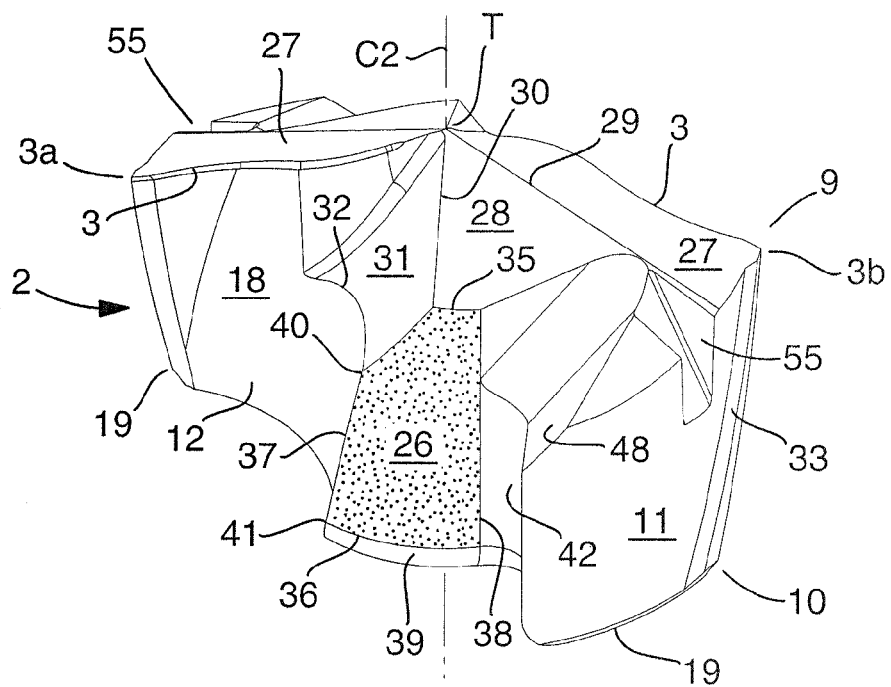
FIG. 3 is an enlarged exploded view showing the loose top of FIG. 1 and the front end of the basic body of FIG. 1 in a top perspective view.
Figure 3:
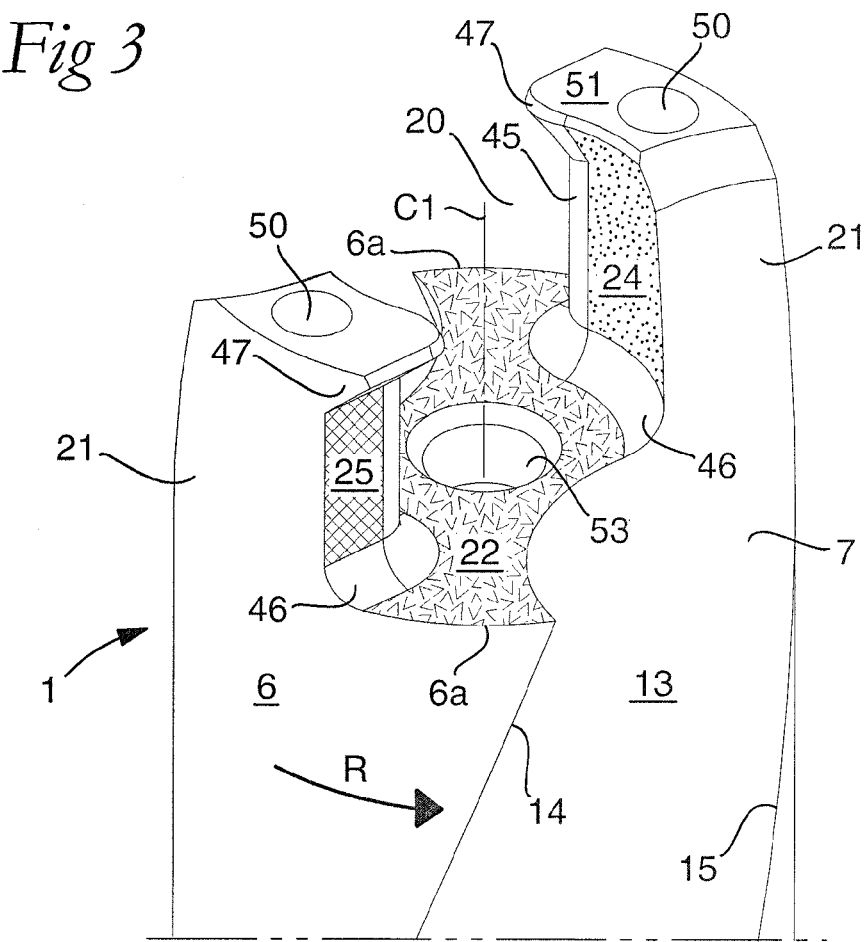

As is seen in FIGS. 3 and 5, the individual side contact surface 26 is delimited by front and rear borderlines 35, 36 as well as by a pair of side borderlines 37, 38. The frontal, broken borderline 35 forms a transition to the two clearance surfaces 28, 31 of the front end 9, while the rear borderline 36 is situated near the rear axial contact surface 10 of the loose top and separated from the same via a narrow radius transition 39. The side borderline 37 forms a transition to the concave limiting surface 18 of the chip flute 12. Because the chip flute in this case is helicoidal, the side borderline 37 runs at a moderate, acute angle in relation to the center axis C2 of the loose top. The side borderline 37 extends between front and rear end points 40, 41, the rear one 41 of which is trailing the front one 40 during rotation, and the front one 40 of which is situated at a greater radial distance from the center axis C2 than the rear one 41. The radial distance from the center axis C2 may be about 0.03 mm greater. The opposite side borderline 38 forms a transition to a recess surface 42. As may be best seen in FIG. 7, said recess surface 42 transforms into a tangential contact surface 43 in the immediate vicinity of the envelope surface 11. In the operative state, the tangential support surfaces 25 of the branches 21 are held pressed against the surfaces 43 in order to transfer torque to the loose top, at the same time as the inner support surfaces 24 of the branches are held pressed against the side contact surfaces 26 rotationally trailing the tangential contact surfaces in order to fasten the loose top.

Figure 4:
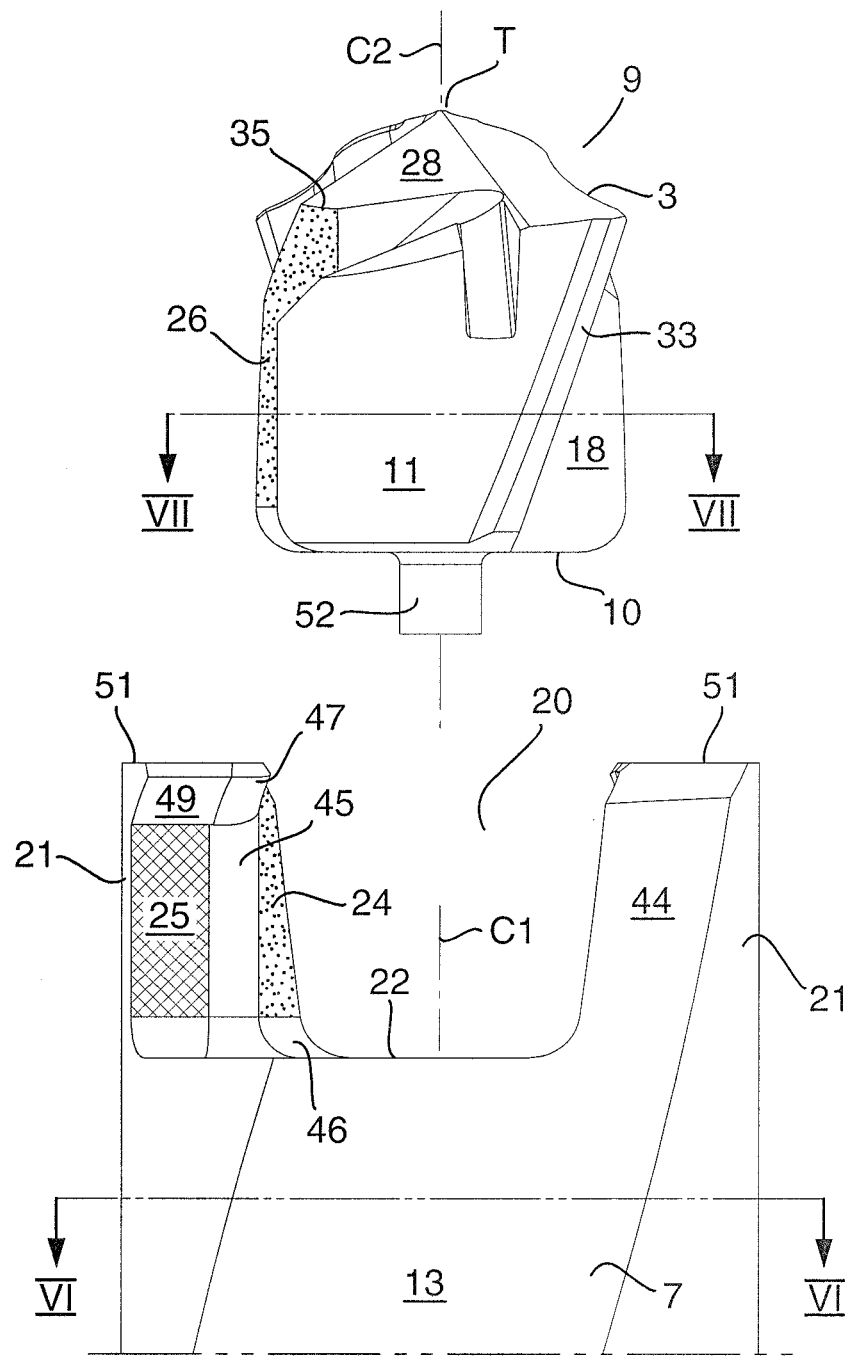
FIG. 4 is an exploded view showing the basic body and the loose top of FIG. 1 in side elevation.

As is seen in FIGS. 3-5, different part surfaces, which together are included in the front end surface or end generally designated 9, are situated on different levels and at different angles in relation to each other. Of said part surfaces, the two part surfaces 28, 31, which form clearance surfaces behind the individual cutting edge 3, and to which the side contact surfaces 26 are connected, are partly wedge-shaped and taper toward the front tip T.

Figure 16:
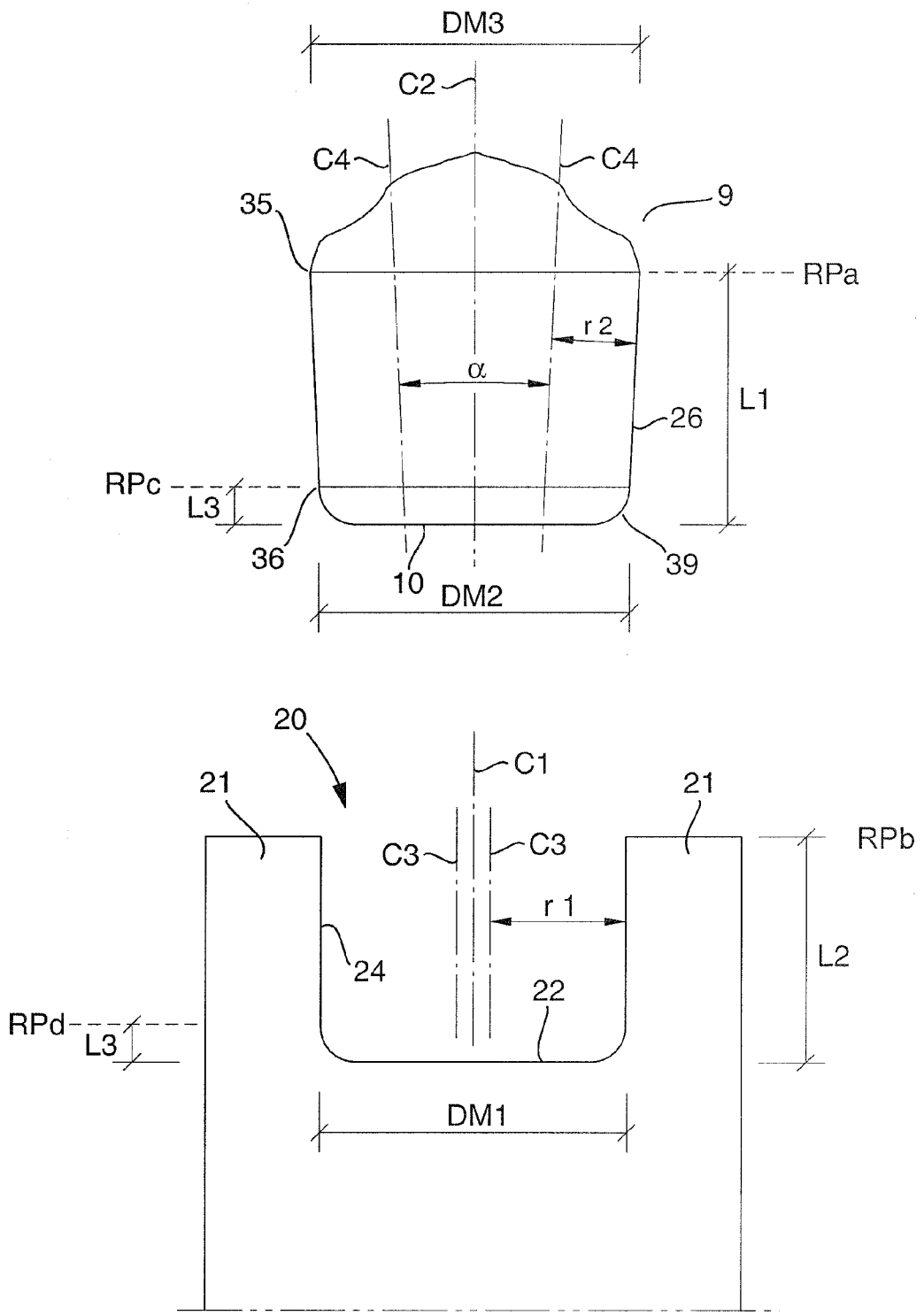
FIG. 16 is a schematic exploded view showing geometrical features of an exemplary basic body and loose top, respectively, on an exaggerated scale.
Figure 17:
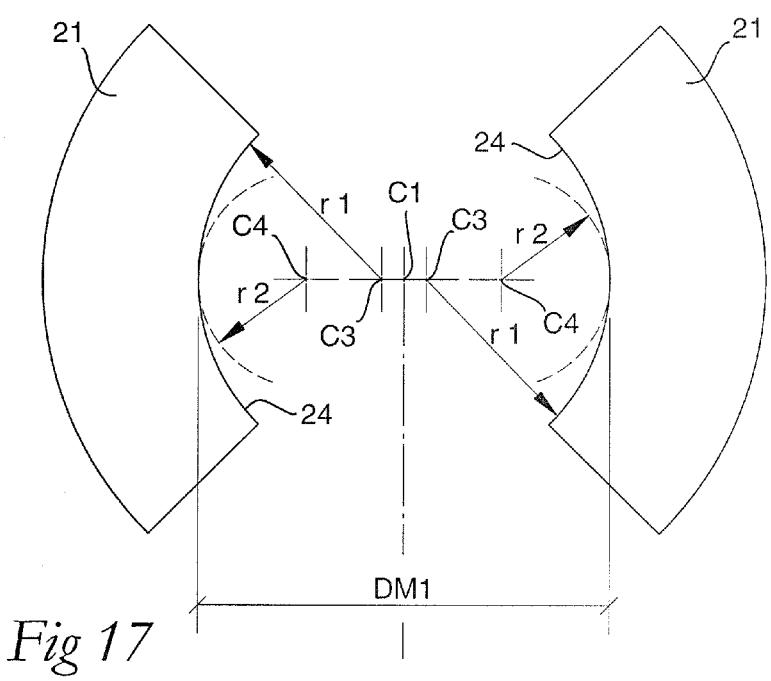
FIG. 17 is a schematic planar view that supplements the picture according to FIG. 16, FIGS. 18-20 are perspective exploded views showing an alternative embodiment.

An additional, feature that is not visible to the naked eye in FIGS. 1-7 has been shown schematically on an exaggerated scale in FIGS. 16 and 17. In these figures, the flexible branches 21 are assumed to be unloaded or strainless. The inner support surfaces 24 of the branches 21 are in this case cylindrical and concentric with center axes C3, and have a radius of curvature that is designated $r_1$. In the example, said center axes C3 are parallel to the center axis C1 of the basic body, and the surfaces 24 run parallel to C1. Also the side contact surfaces 26 of the loose top 2 are cylindrical and concentric with center axes C4, and have a radius of curvature $r_2$. In this case, however, the center axes C4 diverge in the direction from the rear end 10 of the loose top toward the front one 9 at an angle of divergence α. In FIG. 16, RPa designates a reference plane that extends perpendicular to the center axis C2 of the loose top, and is situated at the distance L1 from the rear end 10 of the loose top. In the example, RPa is assumed to be inserted on a level with the front end borderlines 35 of the side contact surfaces 26, including, for example, in the transitions to the clearance surfaces 28 in the front end 9 of the loose top. A reference plane RPb through the basic body 1 is located on a level with the free ends 51 of the branches at the axial distance L2 from the axial support surface 22.

Two other reference planes RPc and RPd (the first-mentioned one of which is located on a level with the rear end borderlines 36 of the side contact surfaces 26) are comparable so far that they are located at one and the same axial distance L3 from the axial contact surface 10 and the axial support surface 22, respectively. The dimension DM1 designates a diametrical dimension (not to be confused with the concept "diameter") between the inner support surfaces 24 of the branches. Because the inner support surfaces 24 run parallel to the center axis C1 of the basic body, DM1 is always equally great in arbitrary section along the distance L2 as long as the branches are unloaded. Furthermore, DM2 designates a diametrical dimension between the side contact surfaces 26 in the plane RPc, and DM3 a corresponding dimension in the plane RPa. Because the side contact surfaces 26 run apart at the angle of divergence α, DM3 becomes greater than DM2. This means that said diametrical dimension successively increases from a smallest value DM2 in the plane RPc to a greatest value DM3 in the plane RPa. Alternatively expressed, the greatest diametrical dimension in arbitrary reference planes along the center axis C2 becomes greater the closer to the front end 9 the reference planes are situated.

In a concrete example of the drilling tool, DM2 amounts to 9.00 mm, while DM3 amounts to 9.08 mm. This means that α amounts to 0.56° (α/2=0.28). DM1 could be exactly as great as DM2. In order to facilitate mounting of the loose top and avoid tolerance problems, a certain overmeasure of DM1 can be utilized, which therefore, under said conditions, is determined to be 9.02 mm. When the loose top is mounted in the jaw, which is effected by turning-in and not by axial pressing-in, each branch will therefore deflect 0.08/2−0.02/2=0.03 mm in the area of the front, free end thereof. In other words, the pinch or grip of the branches 21 is concentrated to the reference plane RPb situated on a level with the free ends 51 of the branches, where the branches have their maximal bending capacity. During the turning-in, the branches 21 will join the diverging shape of the loose top along a great part of their length extension L2 in the backward direction from the front end 9.

In FIG. 17, the inner support surfaces 24 are shown having a radius of curvature $r_1$ that is less than half of DM1 ($r_1$<DM1/2) and the center axes C3 being eccentrically placed in relation to the center axis C1 of the basic body. C1 and C3 may also coincide, the two surfaces 24 forming parts of a common cylinder or circle. Furthermore, the side contact surfaces 26 of the loose top have, in this case, a radius of curvature $r_2$ that is less than $r_1$, such that the surfaces 26, 24 obtain a simple line contact in the operative state. Also, the radius of curvature $r_2$ of the surfaces 26 may vary and either be as great as $r_1$ (coinciding surface contact) or greater, a double line contact being obtained.

Reference is now made to FIG. 5, from which it is seen that the axial contact surface 10 of the loose top obtains a §-like contour shape. The §-like countour arises from, among other things, the existence of the C-shaped web portions 26a (see FIG. 7) that thicken the loose top in relation to the central core 17b. In FIG. 3, it is seen that the axial support surface 22 in the basic body 1 has the same §-like contour shape as the axial contact surface 10 of the loose top 2. This shape has been made possible by the fact that the width or tangential extension of the branch 21 between the surface 25 and an opposite surface 44 (not seen on the left branch in FIG. 4, but visible on the right one) has been reduced in relation to the corresponding width of the envelope surface 6. In such a way, a space being present rotationally in front of each branch 21 can be utilized to provide an axe blade-like peripheral surface portion, the shape of which corresponds to the corresponding, peripheral surface portion of the surface 10. In FIG. 5, it is furthermore seen that the axial contact surface 10 extends diametrically between arched borderlines 11a adjacent to the envelope surface 11. In an analogous way, the axial support surface 22 (see FIG. 3) extends between arched borderlines 6a toward the envelope surface 6 of the basic body.

With reference to FIGS. 3 and 4, the individual branch 21 includes two types of radius transitions, a first, upright radius transition 45 between the inner support surface 24 and the tangential support surface 25, and a second, lying radius transition 46 between the axial support surface 22 and the surfaces 24, 25. The radius transition 46, which is concave, has a smaller radius than a corresponding radius transition 39 on the loose top. The upright radius transition 45, which is convex, has a greater radius than the recess surface 42 (see FIGS. 3 and 7).

Normally, the resilient pinch between the branches 21 of the basic body should be enough to retain the loose top in the jaw and to prevent retraction of the drilling tool out of a hole when the loose top is subjected to forces that aim to pull out the same from the jaw. In order to avoid unintentional retraction of the loose top, the basic body has been provided with particular lock means that in the embodiment according to FIGS. 1-15 includes brackets or lips 47, which protrude from the front ends 51 of the branches 21. Although the individual lip 47 could protrude radially inward from the appurtenant branch, the lip is, in specific embodiments, formed adjacent to the torque-transferring tangential support surface 25 in order to bridge over a part surface 48 (see FIG. 3) included in the front end 9 of the loose top. Said part surface 48 is peripherally situated and leans obliquely downward/rearward in the direction of rotation toward the tangential contact surface 43 of the loose top. The lip 47 is wedge-shaped and includes an inclined lower stop surface 49 (see FIGS. 4 and 5) that is facing the part surface 48. However, the surfaces 48, 49 do not abut against each other during drilling, in that the lip 47 is located at a certain distance from the surface 48 in the operative state. This is most clearly seen in the detailed section in FIG. 12 that shows how the stop surface 49 of the lip is spaced-apart a short distance from the part surface 48. If the elastic branches are under severe conditions that would release the resilient frictional grip on the loose top, then the lips 47 come into action. In other words, the lips are passive under normal conditions and are activated if required. In this connection, it should be pointed out that the drilling tool during retraction still is rotated, and therefore the surface 25 is always held strongly pressed against the surface 43 of the loose top. Therefore, the lips 47 form a foolproof lock means during the retraction of the drilling tool.

Figure 6:
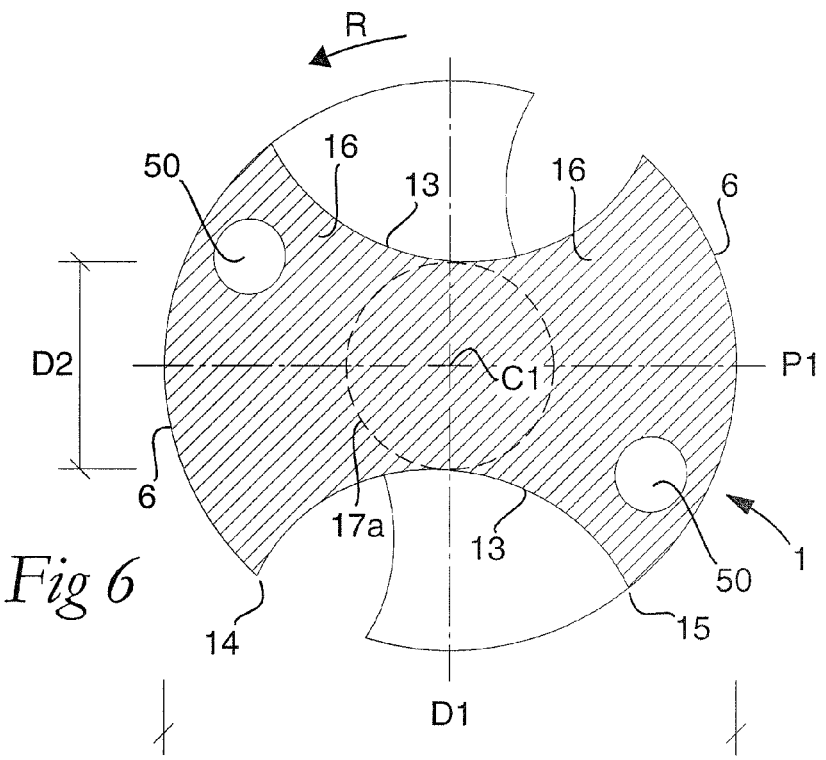
FIG. 6 is a cross section VI-VI through the basic body in FIG. 4.
Figure 7:
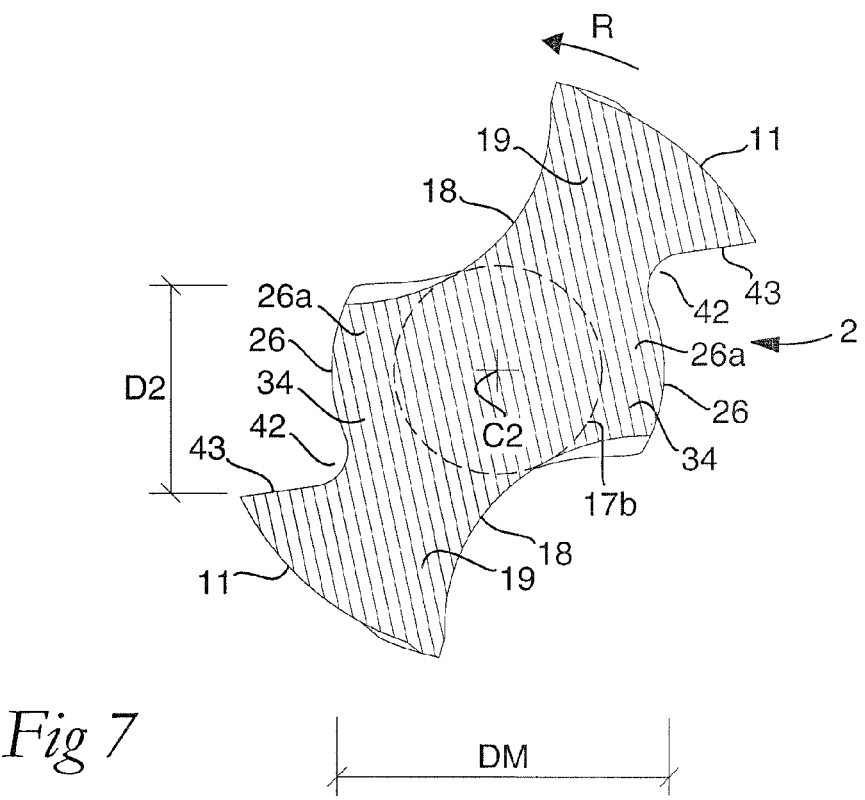
FIG. 7 is a cross section VII-VII through the loose top in FIG. 4.
Figure 8:
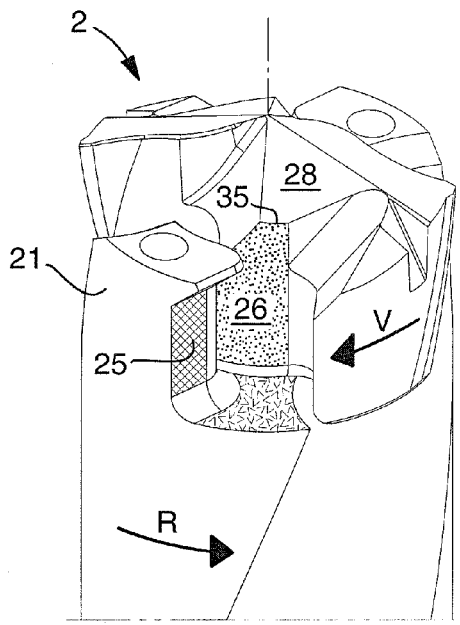
FIG. 8 is a perspective view showing an exemplary loose top in an initial position in connection with turning-in into a jaw of an exemplary basic body.
Figure 9:
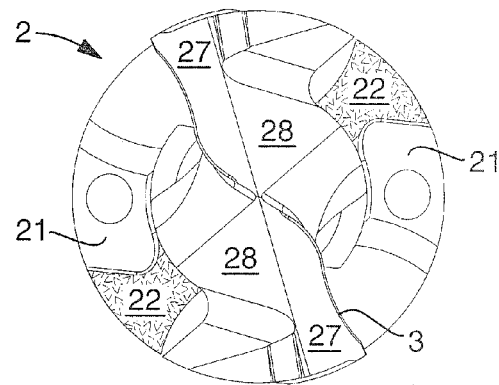
FIG. 9 is a planar view from above the loose top in the position according to FIG. 8.
Figure 10:
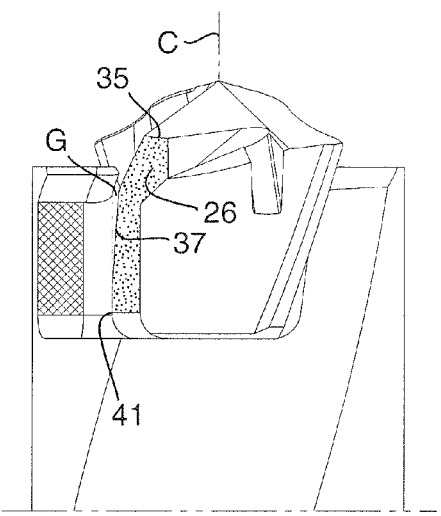
FIG. 10 is a side view of the loose top in the position according to FIG. 8.
Figure 11:
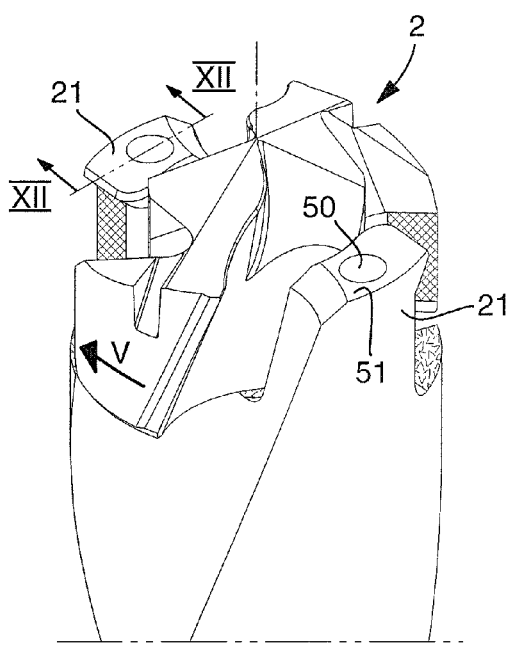
FIG. 11 is a top perspective view showing the loose top in the same position as in FIG. 8, although as viewed at another angle than therein.
Figure 12:
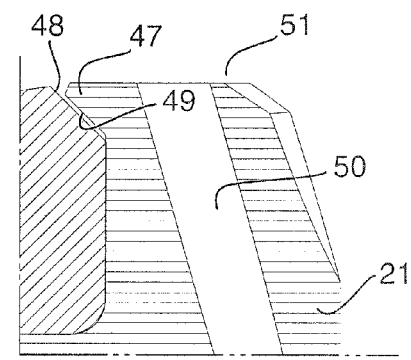
FIG. 12 is a detailed section XII-XII in FIG. 11.

In FIGS. 6 and 12, numeral 50 designates two cooling liquid ducts that run through the basic body 1 and mouth in the front end surfaces 51 of the branches 21 (see also FIG. 3).

In FIGS. 8-11, the loose top 2 is shown in an initial position immediately before the turning-in into the jaw 20 of the basic body. To this position, the loose top can be inserted axially between the branches because the central part of the loose top is housed in the jaw in exactly this state. In order for the loose top during the subsequent turning-in into the jaw to provisionally retain a reasonably centered position in relation to the basic body, the basic body and the loose top are formed to be cooperating and coarse-centering. In the embodiment according to FIGS. 1-15, the basic body and loose top are cooperating and coarse-centering by a cylindrical pin 52 (see FIGS. 4 and 5), which protrudes axially rearward from the axial contact surface 10 of the loose top 2 and is concentric with the center axis C2, and a hole 53 (see FIG. 3) that mouths in the axial support surface 22 of the basic body and is concentric with the center axis C1. The pin 52 has a diameter that can be less than the inner diameter of the hole 53, because the pin only has the purpose of retaining the loose top in a reasonably centered position during the turning-in. Neither the pin nor the hole are operatively active during drilling, since they lack surface contact with each other. The pin and the hole may therefore be provided without any requirements of dimensional accuracy.

In FIG. 3, it is seen how the loose top 2 includes a key grip in the form of two notches or seats 55 that are peripherally situated and open in the envelope surface 11 and in the front end 9 adjacent to the primary clearance surface 27. As a consequence of the peripheral placement of the seats 55, the distance between the seats will be optimal, and therefore a suitably formed key (not shown) can apply a strong torque to the loose top without any excessive manual force in connection with the turning-in.

Reference is now made to FIGS. 13-15. FIG. 13 is an exploded view in side elevation and FIGS. 14 and 15 are cross sections through the loose top and the basic body, respectively. From the cross section in FIG. 14, it is seen that the tangential contact surface 43 of the loose top forms an acute angle β with an imaginary radius that is tangent to the recess surface 42. In FIG. 15, it is seen that the tangential support surface 25 of the individual branch 21 forms an angle γ with an imaginary radius that is tangent to the radius transition 45 between the surface 25 and the inner support surface 24. When the surfaces 25, 43 are pressed against each other during drilling, the loose top will apply a force component to the individual branch 21 that aims to press in the branch against the core of the loose top. In other words, the inclination of the surfaces 25, 43 contributes to hold the inner support surfaces 24 of the branches distinctly pressed against the side contact surfaces 26 in addition to the clamping force that the inherent elasticity of the branches guarantees. The angles β and γ may be equally great, for example, within the range of 20-30°. However, they may also differ, for instance by γ being made somewhat greater than β. In such a way, the transfer of torque is concentrated to the inner parts of the tangential contact surfaces 43 adjacent to the recess surfaces 42.

By precision grinding or in another way finishing at least the pairs of side contact surfaces 26 and tangential contact surfaces 43 to meticulous dimensional accuracy, the loose top obtains a good centering and position precision. Finishing the tangential contact surfaces 43 contributes to good centering and position precision, because in such a way it is guaranteed that the branches 21 are pressed simultaneously, and without play, against the same. Also the axial contact surface 10 may advantageously be precision ground.

When the loose top 2 is to be applied to the basic body 1, the loose top is inserted axially into the jaw 20 between the branches 21 to the initial position shown in FIGS. 8-11. Here, the pin 52 engages the hole 53 and holds the loose top provisionally in place in an intermediate position. From this initial position, the loose top is turned in a turning direction V that is opposite the direction of rotation R of the basic body, until the surfaces 25, 43 contact each other. When the side contact surfaces 26 of the loose top initially approach the inner support surfaces 24 of the branches 21, a lower part of the side borderline 37 (at a certain axial distance from the lower end point 41, depending on the difference between DM1 and DM2 according to FIG. 16) will first contact the inner support surface. The remainder of the side borderline 37 is separated from the inner support surface via a gap G (see FIG. 10) that widens forward (upward in the figure). During the continued turning from this position, larger and larger parts of the side borderline 37 will successively contact the inner support surface so as to then reach an end position where the same, under ideal conditions, is in contact with the inner support surface along the major part of its length. In said end position, the tangential support surface 25 of the branch is held pressed against the cooperating tangential contact surface 43 of the loose top. During the turning-in, the branches 21 will successively apply an increasing clamping force to the side contact surfaces 26 of the loose top that finally reaches a maximum value. An advantage of the borderline 37 of the individual side contact surface 26 being inclined in relation to the center axis of the loose top, and not running parallel to the same, is that the loose top initially can be turned at a moderate resistance that successively increases until the loose top assumes its operative end position. In practice, this means that the loose top can be turned-in in a smooth way without excessively great manual forces needing to be applied to the key in question.

When the loose top is to be loosened, the turning direction V is reversed, whereupon the loose top is pulled axially out of the jaw of the basic body.

An advantage of the tool is that the loose top at all events is securely pinched between the front portions of the two side contact surfaces, where the branches are most bendable and give an optimal clamping force. If the side contact surfaces, as in the example shown, extend all the way up to the rear axial contact surface, the loose top is securely pinched along the major part of its length. If DM1 and DM2 are made equally great, a pinching along the entire length would be possible. In such a way, an extremely good grip is guaranteed, besides which the loose top can be given a minimal volume in relation to its diameter. In the example shown, the loose top has accordingly an axial length that is considerably smaller than its diameter. More precisely, the total length (from the axial contact surface 10 to the tip T) amounts to only approximately 60% of the diameter. The advantageous consequence of this relationship is that the consumption of expensive material in the loose top is reduced to an absolute minimum. Another advantage is that the basic body can transfer considerable torques to the loose top because the tangential support surfaces of the branches can be given an optimized length. Furthermore, the loose top can be mounted and dismounted in a simple and convenient way without other means than a simple key. To the smooth mounting, also the fact that the side contact surfaces of the loose top are delimited by inclined side limiting lines that successively are brought into contact with the inner support surfaces of the branches contributes significantly. In addition, the centering of the loose top in relation to the basic body can be guaranteed in a simple way in connection with industrial series manufacturing. Accordingly, not only the two side contact surfaces of the loose top, but also the axial contact surface and the two torque-carrying tangential contact surfaces, are well exposed and easy to access for a grinding tool by which these surfaces can be precision ground. In other words, the surfaces are not delimited by any protruding limiting surfaces of the type that is included in the pockets in the loose top according to EP 1013367.

Figure 18:
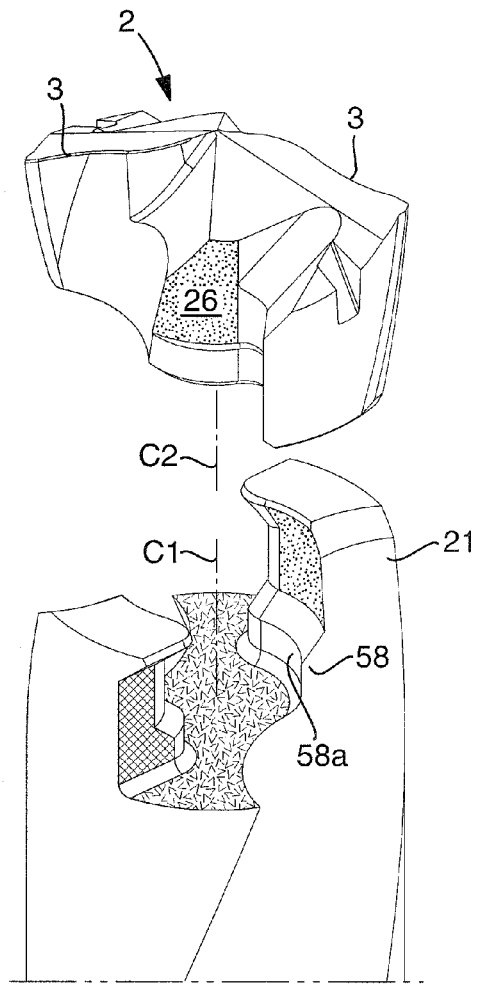
Figure 19:
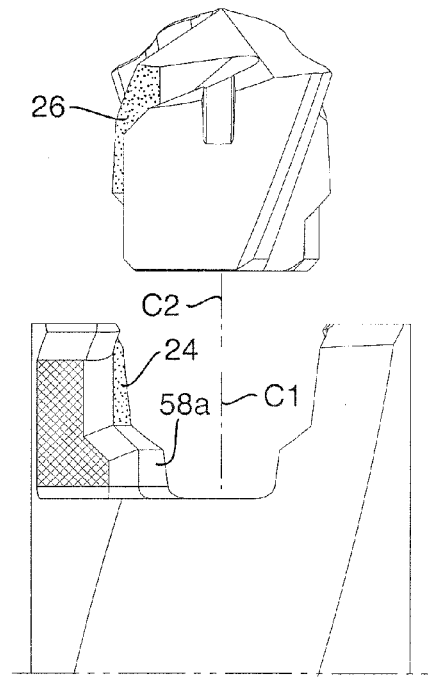
Figure 20:
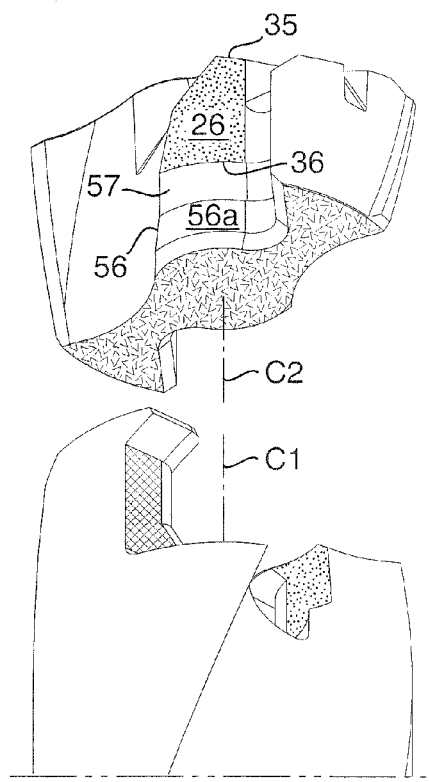

In FIGS. 18-20, an alternative embodiment is shown, in which the side contact surface 26 of the loose top has been shortened and ends at a certain distance from the rear end 10. More precisely, the side contact surface 26 transforms into a waist 56 that is delimited by a pair of opposite, convex surfaces 56a. The transition between the surfaces 26 and 56a may advantageously be conical surfaces 57. The individual surface 56a cooperates with a cylindrical, or otherwise rotationally symmetrically shaped surface 58a of a border 58 in the area between the inner support surface 26 and the axial support surface 22 of the jaw in order to form together a coarse-centering means that replaces the combination of pin and hole in the previously described embodiment. The surfaces 56a may have a diameter that is less than the diameter of the surfaces 58a, whereby the surfaces do not contact each other in the operative state. However, the cooperating pairs of surfaces 56a, 58a function as a means for holding the loose top in an intermediate position in connection with the turning-in. The fact that the side contact surfaces 26 are shortened has, in addition, the advantage that the risk of tolerance errors in the rear part of the loose top is eliminated, the pinching of the loose top being concentrated to the front part of the loose top, such as the same is determined by the length extension of the surfaces 26.

Figures 21, 22:
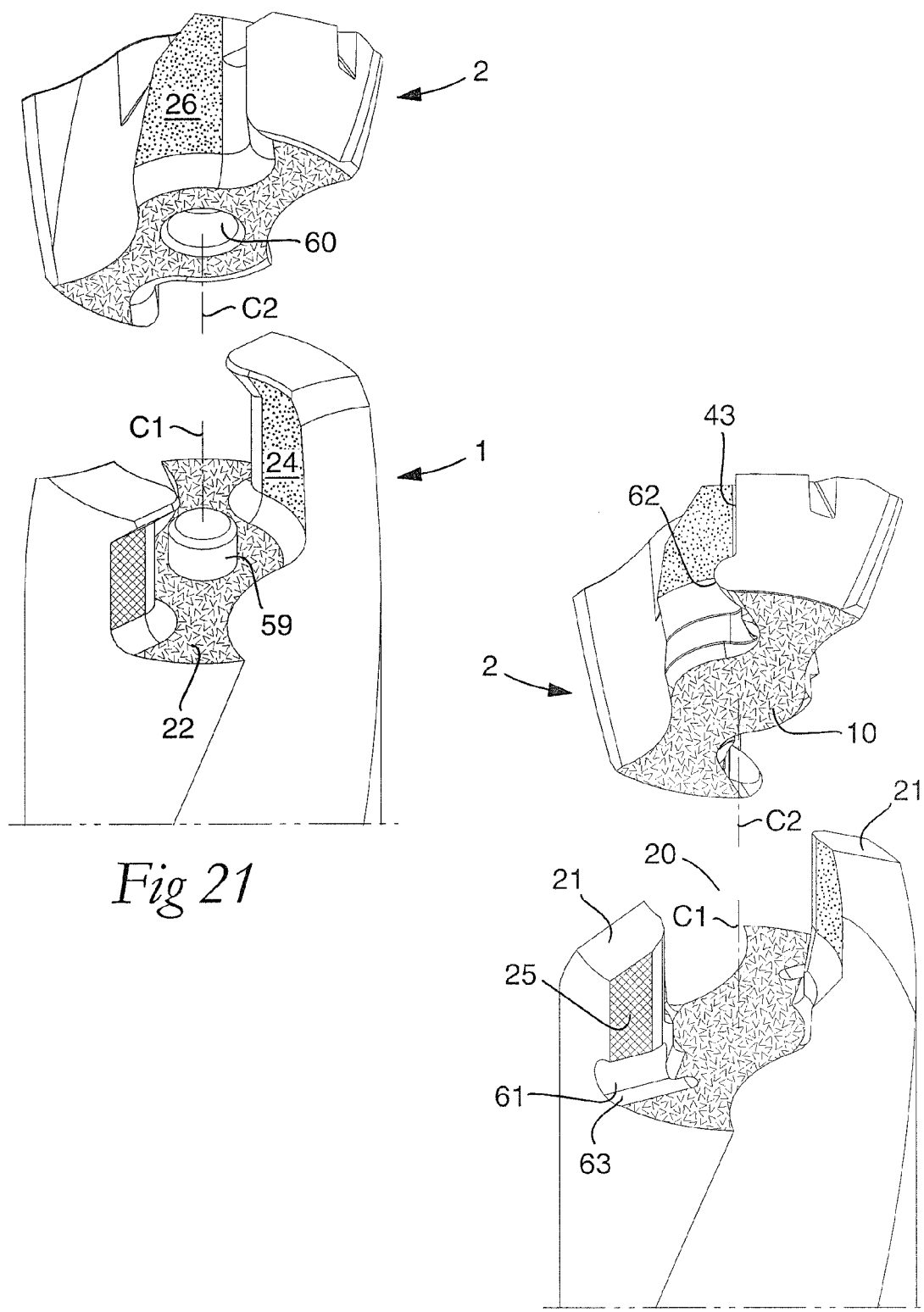
FIG. 21 is a perspective exploded view showing a third alternative.
FIG. 22 is an exploded view showing yet an additional alternative embodiment.

In FIG. 21, an alternative pin 59 for coarse centering is shown that sticks up from the axial support surface 22 of the basic body and is concentric with the center axis C1. Said pin cooperates with a centric hole 60 that mouths in the axial contact surface 10 of the loose top. Like the embodiment according to FIGS. 1-15, the diameter of the hole 60 is greater than the diameter of the pin 59, and therefore neither the hole nor the pin requires any fine dimensional accuracy. The purpose of the pin and hole is to temporarily coarse-center the loose top in connection with beginning the turning-in of the loose top.

In FIG. 22, there is illustrated an additional alternative drilling tool that includes another way of axially locking than those shown in FIGS. 1-15. In this case, a seat 61 recessed in the rear end of the individual branch 21 and a male member 62 that is situated in the vicinity of the axial contact surface 10 of the loose top 2 and is insertable into the seat when the loose top is turned into its finally clamped, operative end position between the branches. In a specific embodiment, the seat 61 is in the form of a chute that is situated behind the individual tangential support surface 25 of the branch 21. More specifically, the seat 61 is situated between the rear end of the tangential support surface 25 and the axial support surface 22 of the jaw 20. A concave clearance surface 63 forms a transition between the chute and the axial support surface. The male member 62 is a ridge that is formed between the axial contact surface 10 and the rear end of the tangential contact surface 43 of the loose top. The cross-sectional area of the ridge 62 is less than the cross-sectional area of the chute 61, and therefore the convex limiting surface of the ridge will lack contact with the concave limiting surface of the chute as long as the grip of the branches 21 on the loose top is sufficiently strong in order to retain the same in the jaw 20. In other words, the lock means, as well as the lips 47 in the previously described embodiment, are normally passive and are activated if and when the branches unintentionally tend to lose their grip of the loose top.

Further, the side contact surfaces of the loose top may be given a varying length as well as a varying shape, provided that the same extend axially rearward from the front end of the loose top. Correspondingly, the branches that delimit the front jaw of the basic body may be formed in various ways provided that the internal support surfaces can cooperate with the side contact surfaces of the loose top in the previously described way. The requisite difference in diametrical dimension between the side contact surfaces of the loose top and the inner support surfaces of the branches may also be realized in another way than by exactly cylindrical surfaces, for example, conical surfaces or a combination of cylindrical and conical surfaces. Instead of being convex and concave, respectively, the side contact surfaces and the inner support surfaces may also be plane. Furthermore, it is feasible to apply the disclosed to drilling tools, the loose tops of which include three cutting edges, three chip flutes and three side contact surfaces that cooperate with three flexible branches. In addition, the rear axial contact surface of the loose top does not necessarily need to be a single, plane surface. Accordingly, the surface may include two or more mutually separated part surfaces located in a common plane.

Although described in connection with preferred embodiments thereof, it will be appreciated by those skilled in the art that additions, deletions, modifications, and substitutions not specifically described may be made without departure from the spirit and scope of the invention as defined in the appended claims.

The invention claimed is:

1. Drilling tool for chip removing machining, comprising:
a basic body having front and rear ends, and an envelope surface that includes two countersunk chip flutes and is concentric with a first center axis around which the basic body is rotatable in a given direction of rotation; and
a loose top that includes front and rear ends, the rear end serving as an axial contact surface, and an envelope surface that is concentric with a second center axis and includes two countersunk chip flutes between which two bars projecting radially from a central core are delimited, wherein each bar includes a cutting edge in the front and a number of clearance surfaces positioned rotationally behind the cutting edge,
wherein a front end of the basic body comprises a jaw that is delimited by a bottom forming an axial support surface and two peripherally situated branches that protrude axially from the axial support surface, are elastically bendable, and clamp the loose top in the jaw,
wherein a pair of inner support surfaces of the branches are resiliently pressed against a pair of external side contact surfaces of the loose top during operation,
wherein the loose top is turnable into and out of engagement with the jaw of the basic body,
wherein the two side contact surfaces of the loose top extend rearward from at least one clearance surface included in the front end, and a greatest diametrical dimension between the side contact surfaces in a first reference plane, which is perpendicular to the second center axis and situated nearer the front end than the rear end, is greater than an analogous diametrical dimension between the inner support surfaces of the branches when the branches are unloaded, and
wherein each of the two peripherally situated branches include an inner support surface, a tangential support surface and a front end surface and, when the branches are unloaded, a first diametrical dimension between the inner support surfaces is equally great in an arbitrary reference plane, which is perpendicular to the first center axis, along a major portion of an axial distance from a first end of the inner support surface that is proximate the axial support surface to a second end of the inner support surface that is proximate the front end surface, and
wherein the branches are deflectable, radially outward relative to the first center axis, from an unloaded position when a portion of the side contact surfaces of the loose top corresponding to the greatest diametrical dimension are turned to contact a portion of the inner support surfaces of the branches corresponding to the first diametrical dimension.

2. The drilling tool according to claim 1, wherein a greatest diametrical dimension between the side contact surfaces in arbitrary reference planes that extend perpendicular to the second center axis is greater the closer to the front end of the loose top the reference planes are situated.

3. The drilling tool according to claim 2, wherein a greatest diametrical dimension in a third reference plane nearest the rear end of the loose top is at most as great as a greatest diametrical dimension between the inner support surfaces of the branches in a comparable fourth reference plane of the basic body nearest the axial support surface.

4. The drilling tool according to claim 1, wherein the inner support surfaces of the branches are concave and the side contact surfaces of the loose top are convex.

5. The drilling tool according to claim 4, wherein the inner support surfaces of the two branches are first cylinder surfaces, which are concentric with center axes that run parallel to the first center axis when the branches are unloaded, and
wherein the two side contact surfaces of the loose top are second cylinder surfaces, which are concentric with center axes that diverge in the direction from the rear end of the loose top toward the front end, the first reference plane in which a diametrical dimension is greatest being situated flush with the front ends of the cylinder surfaces.

6. The drilling tool according to claim 5, wherein the individual first cylinder surface has a first radius of curvature that differs from a second radius of curvature of the cooperating second cylinder surface.

7. The drilling tool according to claim 1, wherein the axial support surface of the basic body has a shape and size that corresponds to that of the axial contact surface of the loose top.

8. The drilling tool according to claim 1, wherein the individual side contact surface of the loose top is connected to a chip flute that is helicoidal, and therefore the side contact surface includes a side borderline that runs at an acute angle in relation to the second center axis as viewed in side elevation.

9. The drilling tool according to claim 1, wherein the individual side contact surface of the loose top extends between front and rear end borderlines, the front end borderline forms a direct transition to said at least one clearance surface in the front end of the loose top, while the rear end borderline is situated nearer the rear end of the loose top than the front end of the loose top.

10. The drilling tool according to claim 1, wherein the two side contact surfaces of the loose top extend axially from the at least one clearance surface of the front end to a radius transition to the axial contact surface.

11. The drilling tool according to claim 1, wherein the two side contact surfaces of the loose top extend axially rearward from the at least one clearance surface of the front end to a rear waist, which is delimited by two opposite, convex part surfaces that are situated nearer the second center axis than the side contact surfaces.

12. The drilling tool according to claim 1, wherein the drilling tool comprises centering elements for provisional coarse-centering of the loose top in connection with the turning-in thereof into the jaw of the basic body.

13. The drilling tool according to claim 12, wherein the centering elements comprise a centrically situated pin that protrudes axially rearward from the axial contact surface of the loose top, and a centrically situated hole that has a greater diameter than the pin and mouths in the axial support surface of the basic body.

14. The drilling tool according to claim 12, wherein the centering elements comprise a centrically situated hole that mouths in the axial contact surface of the loose top, and a centrically situated pin that has a smaller diameter than the hole and sticks up from the axial support surface of the basic body.

15. The drilling tool according to claim 12, wherein the centering elements comprise two convex part surfaces of a waist of the loose top, and a pair of borders formed adjacent to the rear ends of the branches having concave, internal guide surfaces.

16. The drilling tool according to claim 1, wherein the basic body comprises locking elements to prevent unintentional axial retraction of the loose top out of the jaw.

17. The drilling tool according to claim 16, wherein the locking elements comprise a bracket formed on the free end of the individual branch.

18. The drilling tool according to claim 17, wherein the bracket is situated in the axial extension of a torque-transferring tangential support surface of the branch, and spaced-apart from a part surface included in the front end of the loose top.

19. The drilling tool according to claim 16, wherein the locking elements comprise a seat recessed in the rear end of the individual branch, and a male member that is situated adjacent to the axial contact surface of the loose top and is insertable into the seat.

20. The drilling tool according to claim 19, wherein the seat is a chute situated behind a torque-transferring tangential support surface of the branch, and the male member is a ridge situated behind a cooperating tangential contact surface of the loose top.

21. The drilling tool according to claim 1, wherein the two side contact surfaces of the loose top are concave with a recess surface transforming radially into a tangential contact surface,
wherein the tangential contact surface of the loose top forms a first angle, $\beta$, with an imaginary radius that is tangent to the recess surface,
wherein the tangential support surface of the individual branch forms a second angle, $\gamma$, with an imaginary radius that is tangent to a radius transition between the tangential support surface and an inner support surface, and
wherein the second angle has a value that is equal to or greater than a value of the first angle.

22. The drilling tool according to claim 1, wherein each branch includes a lip between the inner support surface and the front end surface, the lip protruding radially inward of the inner support surface.

23. Loose top for drilling tools comprising:
front and rear ends, and
an envelope surface that is concentric with a center axis and in which at least two chip flutes are countersunk, between which two bars projecting radially from a central core are delimited,
wherein the front end of each bar includes a cutting edge and a number of clearance surfaces positioned rotationally behind the cutting edge, and two external side contact surfaces capable of widening a jaw that receives the loose top and is situated between two branches of a cooperating basic body,
wherein the rear end is an axial contact surface that forms a right angle with the center axis and extends between diametrically opposed borderlines adjacent to the envelope surface,
wherein the two side contact surfaces extend rearward from at least one clearance surface included in the front end, and
wherein a greatest diametrical dimension between the side contact surfaces in arbitrary reference planes that extend perpendicular to the center axis is greater the closer to the front end the reference planes are situated.

24. The loose top according to claim 23, wherein the side contact surfaces are cylinder surfaces, which are concentric with center axes that diverge in the direction from the rear end toward the front end.

25. The loose top according to claim 23, wherein the side contact surfaces are included in web portions that are thickened in relation to the core.

26. The loose top according to claim 23, wherein each individual side contact surface is connected to a chip flute that is helicoidal, the side contact surface having a side borderline that runs at an acute angle in relation to the center axis as viewed in side elevation.

27. The loose top according to claim 23, wherein each individual side contact surface extends between front and rear end borderlines, the front end borderline forms a direct transition to said at least one clearance surface in the front end, while the rear end borderline is situated nearer the rear end of the loose top than the front end borderline.

28. The loose top according to claim 27, wherein the two side contact surfaces extend axially from the at least one clearance surface of the front end to a radius transition bordering on the axial contact surface.

29. The loose top according to claim 27, wherein the two side contact surfaces extend axially from the at least one clearance surface of the front end to a rear waist having a reduced cross-sectional area.

30. The loose top according to claim 29, wherein the waist includes two convex guide surfaces, which serve as centering elements.

31. The loose top according to claim 23, wherein the loose top comprises centering elements for temporary coarse centering in connection with the turning-in thereof into the jaw of a cooperating basic body.

32. The loose top according to claim 31, wherein the centering elements comprise a centrically situated pin that protrudes axially rearward from the axial contact surface.

33. The loose top according to claim 31, wherein the centering elements comprise a centrically situated hole that mouths in the axial contact surface.

34. The loose top according to claim 23, wherein the loose top comprises a protruding male member located adjacent to the rear axial contact surface that locks the loose top axially.

35. The loose top according to claim 34, wherein the male member is situated between the axial contact surface and a torque-carrying tangential contact surface of the individual bar.

36. The loose top according to claim 35, wherein the male member is a ridge.

37. The loose top according to claim 23, wherein the loose top comprises a key grip in the form of a pair of notches that are recessed in the periphery of the front end.

* * * * *